United States Patent
Hochenberger et al.

(10) Patent No.: US 8,639,607 B2
(45) Date of Patent: *Jan. 28, 2014

(54) CONVERSATIONAL DEALING IN AN ANONYMOUS TRADING SYSTEM

(75) Inventors: August M. Hochenberger, East Islip, NY (US); Edward R. Howorka, Denville, NJ (US); Neena Jain, South Plainfield, NJ (US); John C. Gaudio, Middletown, NJ (US); John R. Capuano, Chatham, NJ (US); Gregory Mills, Flanders, NJ (US); Srivathsan Krishnasami, New York, NY (US)

(73) Assignee: EBS Group Limited, London (GB)

( * ) Notice: Subject to any disclaimer, the term of this patent is extended or adjusted under 35 U.S.C. 154(b) by 60 days.

This patent is subject to a terminal disclaimer.

(21) Appl. No.: 12/891,246

(22) Filed: Sep. 27, 2010

(65) Prior Publication Data

US 2011/0016038 A1 Jan. 20, 2011

Related U.S. Application Data

(63) Continuation of application No. 09/603,390, filed on Jun. 23, 2000, now Pat. No. 7,827,085.

(51) Int. Cl.
*G06Q 40/00* (2012.01)
(52) U.S. Cl.
USPC ............................................. 705/37; 705/38
(58) Field of Classification Search
USPC ...................................................... 705/35–40
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,823,387 A | 7/1974 | McClellan |
| 4,388,489 A | 6/1983 | Wigan et al. |
| 4,412,287 A | 10/1983 | Braddock, III |
| 4,525,779 A | 6/1985 | Davids et al. |
| 4,531,184 A | 7/1985 | Wigan et al. |
| 4,554,418 A | 11/1985 | Toy |

(Continued)

FOREIGN PATENT DOCUMENTS

| | | |
|---|---|---|
| EP | 0 399 850 A2 | 11/1990 |
| EP | 0411748 A2 | 2/1991 |

(Continued)

OTHER PUBLICATIONS

Shook, R. Wall Street Dictionary. 1999, p. 103.

(Continued)

*Primary Examiner* — Thu Thao Havan
(74) *Attorney, Agent, or Firm* — Dickstein Shapiro LLP

(57) ABSTRACT

An anonymous trading system for financial instruments comprises a network of broking nodes each performing a bid and offer matching function and a market view distribution function. Trader terminals are connected to the network via trading agent nodes. During deal execution a credit check is performed and once the deal is complete the identity of the counterparty becomes known to the other counterparty to the deal. The originating counterparty may send a More quantity message to the other party proposing a further deal at the same price. The other party may decline, partially accept, accept or accept and propose a still further amount. Credit for the further deal is drawn from an external source and the internal credit limits are temporarily increased or disabled to prevent the deal from being rejected.

4 Claims, 12 Drawing Sheets

(56) References Cited

U.S. PATENT DOCUMENTS

| | | | |
|---|---|---|---|
| 4,555,781 A | 11/1985 | Baldry et al. | |
| 4,598,367 A | 7/1986 | DeFrancesco et al. | |
| 4,623,964 A | 11/1986 | Getz et al. | |
| 4,674,044 A | 6/1987 | Kalmus et al. | |
| 4,750,135 A | 6/1988 | Boilen | |
| 4,815,030 A | 3/1989 | Cross et al. | |
| 4,903,201 A | 2/1990 | Wagner | |
| 5,003,473 A | 3/1991 | Richards | |
| 5,034,916 A | 7/1991 | Ordish | |
| 5,077,665 A | 12/1991 | Silverman et al. | |
| 5,136,501 A | 8/1992 | Silverman et al. | |
| 5,195,031 A | 3/1993 | Ordish | |
| 5,230,048 A | 7/1993 | Moy | |
| 5,257,369 A | 10/1993 | Skeen et al. | |
| 5,267,148 A | 11/1993 | Kosaka et al. | |
| 5,270,922 A | 12/1993 | Higgins | |
| 5,287,787 A | 2/1994 | Inoue | |
| 5,375,055 A * | 12/1994 | Togher et al. | 705/37 |
| 5,508,913 A | 4/1996 | Yamamoto et al. | |
| 5,557,780 A | 9/1996 | Edwards et al. | |
| 5,557,798 A | 9/1996 | Skeen et al. | |
| 5,615,269 A | 3/1997 | Micali | |
| 5,710,889 A | 1/1998 | Clark et al. | |
| 5,727,165 A | 3/1998 | Ordish et al. | |
| 5,761,661 A | 6/1998 | Coussens et al. | |
| 5,787,402 A | 7/1998 | Potter et al. | |
| 5,809,483 A | 9/1998 | Broka et al. | |
| 5,815,665 A | 9/1998 | Teper et al. | |
| 5,864,827 A | 1/1999 | Wilson | |
| 5,870,544 A | 2/1999 | Curtis | |
| 5,890,140 A | 3/1999 | Clark et al. | |
| 5,905,248 A | 5/1999 | Russell et al. | |
| 5,905,974 A | 5/1999 | Fraser et al. | |
| 5,909,545 A | 6/1999 | Frese, II et al. | |
| 5,915,209 A | 6/1999 | Lawrence | |
| 5,924,082 A | 7/1999 | Silverman et al. | |
| 5,924,083 A | 7/1999 | Silverman et al. | |
| 5,950,176 A | 9/1999 | Keiser et al. | |
| 5,963,923 A | 10/1999 | Garber | |
| 5,966,531 A | 10/1999 | Skeen et al. | |
| 6,012,044 A | 1/2000 | Maggioncalda et al. | |
| 6,014,627 A | 1/2000 | Togher et al. | |
| 6,014,643 A | 1/2000 | Minton | |
| 6,029,146 A | 2/2000 | Hawkins et al. | |
| 6,317,727 B1 | 11/2001 | May | |
| 6,421,653 B1 | 7/2002 | May | |
| 6,539,362 B1 | 3/2003 | Patterson, Jr. et al. | |
| 6,560,580 B1 | 5/2003 | Fraser et al. | |
| 7,159,116 B2 | 1/2007 | Moskowitz | |
| 7,165,045 B1 * | 1/2007 | Kim-E | 705/37 |
| 2002/0010684 A1 | 1/2002 | Moskowitz | |
| 2002/0138390 A1 | 9/2002 | May | |

FOREIGN PATENT DOCUMENTS

| | | |
|---|---|---|
| EP | 0434224 A2 | 6/1991 |
| EP | 0485252 A2 | 5/1992 |
| EP | 0512702 A2 | 11/1992 |
| EP | 0798635 A1 | 10/1997 |
| EP | 0818746 A2 | 1/1998 |
| EP | 0893758 A2 | 1/1999 |
| EP | 0907134 A1 | 4/1999 |
| FR | 2543327 A1 | 9/1984 |
| GB | 1489574 A | 10/1977 |
| GB | 2165421 A | 4/1986 |
| GB | 2180380 A | 3/1987 |
| GB | 2210714 A | 6/1989 |
| GB | 2282246 A | 3/1995 |
| GB | 2325130 A | 11/1998 |
| GB | 2326256 A | 12/1998 |
| WO | WO-90/02382 A1 | 3/1990 |
| WO | WO-92/07324 A1 | 4/1992 |
| WO | WO-92/15174 A1 | 9/1992 |
| WO | WO-93/15467 A1 | 8/1993 |
| WO | WO-94/15294 A1 | 7/1994 |
| WO | WO-95/06918 A2 | 3/1995 |
| WO | WO-95/18418 A1 | 7/1995 |
| WO | WO-95/30211 A1 | 11/1995 |
| WO | WO-96 05563 A1 | 2/1996 |
| WO | WO-96/18963 A1 | 6/1996 |
| WO | WO-96/34357 A1 | 10/1996 |
| WO | WO-97/08640 A1 | 3/1997 |
| WO | WO-97/22072 A1 | 6/1997 |
| WO | WO-97/24833 A2 | 7/1997 |
| WO | WO-97/31322 A1 | 8/1997 |
| WO | WO-97/33215 A2 | 9/1997 |
| WO | WO-97/36253 A1 | 10/1997 |
| WO | WO-97/43727 A1 | 11/1997 |
| WO | WO-97/45802 A2 | 12/1997 |
| WO | WO-97/49050 A2 | 12/1997 |
| WO | WO-98/05011 A2 | 2/1998 |
| WO | WO-98/13796 A2 | 4/1998 |
| WO | WO-98/21667 A1 | 5/1998 |
| WO | WO-98/24041 A1 | 6/1998 |
| WO | WO-98/26344 A2 | 6/1998 |
| WO | WO-98/26363 A1 | 6/1998 |
| WO | WO-98/36456 A1 | 8/1998 |
| WO | WO-98/38558 A2 | 9/1998 |
| WO | WO-98/47268 A1 | 10/1998 |
| WO | WO-98/49635 A1 | 11/1998 |
| WO | WO-98/49639 A1 | 11/1998 |
| WO | WO-98/53581 A1 | 11/1998 |
| WO | WO-99/01983 A1 | 1/1999 |
| WO | WO-99/08419 A2 | 2/1999 |
| WO | WO-99/10795 A1 | 3/1999 |
| WO | WO-99/14695 A1 | 3/1999 |
| WO | WO-99/19821 A1 | 4/1999 |
| WO | WO-99/27477 A1 | 6/1999 |
| WO | WO-99/33242 A1 | 7/1999 |
| WO | WO-99/35583 A1 | 7/1999 |
| WO | WO-99/36875 A1 | 7/1999 |
| WO | WO-99/40502 A1 | 8/1999 |
| WO | WO-99/41690 A1 | 8/1999 |
| WO | WO-99/50771 A1 | 10/1999 |
| WO | WO-01 59661 A2 | 8/2001 |

OTHER PUBLICATIONS

Downes, J. Dictionary of Finance and Investment Terms. 1998. p. 129.
Mini Computer Forum, Conference Proceedings, 1975.
Wall Street Computer Review, 1998.
Computers in the City, Conference Proceedings, 1988.
Banking Technology, 1988, vol. 5, No. 5.
U.K. Search Report issued Feb. 19, 2001 (in English).

* cited by examiner

MORE REQUEST

ORIGINATING BANK ID
DESTINATION BANK ID
ORIGINATING TRADER ID
DESTINATION TRADER ID
PRICE
TRADE ID
MORE AMOUNT ($M)
CURRENCY

SUBMIT

Figure 10

| CREDIT LIMITS | CREDIT UTILISED | CREDIT AVAILABLE |
|---|---|---|
| $20M | $0 | $20M |
| $20M | $5M | $15M |
| $20M | $12M | $8M |
| $20M | $16M | $4M |

Figure 11

| CREDIT LIMITS | CREDIT UTILISED | CREDIT AVAILABLE |
|---|---|---|
| $20M | $0 | $20M |
| $20M | $5M | $15M |
| $20M | $12M | $8M |
| $20M | $16M | $4M |
| $20M | $66M | $4M |

Figure 12

MORE REQUEST RECEIVED

FROM BANK ID
TO BANK ID
FROM TRADER ID
TO TRADER ID
PRICE
TRADE ID
MORE AMOUNT (SM)
CURRENCY
ACCEPT (Y/N)
AMOUNT ACCEPTED
FURTHER AMOUNTS PROPOSED

SUBMIT

Figure 13

CONVERSATIONAL DEALING IN AN ANONYMOUS TRADING SYSTEM

CROSS REFERENCE TO RELATED APPLICATION

This is a continuation of application Ser. No. 09/603,390, filed Jun. 23, 2000, which is hereby incorporated herein by reference.

FIELD OF THE INVENTION

This invention relates to electronic brokerage systems and in particular to systems in which counterparties trade anonymously within fixed credit limits. Such systems may trade financial instruments such as foreign exchange and forward rate agreements.

BACKGROUND TO THE INVENTION

A number of anonymous trading systems are known in the art. EP-A-0,399,850, EP-A-0,406,026 and EP-A-0,411,748 all assigned to Reuters Ltd disclose aspects of an automated matching system in which a host computer maintains a central database of bids and offers submitted by terminals connected to the host via a network. The host also maintains records of credit limits between each trading bank and the possible counterparties with which it is willing to trade. The host computer uses information in its central, database to match bids and offers and buy and sell orders based on matching criteria which include the counter party credit limits.

Generally, counterparty credit limits are set for each bank or each trading floor and the host computer establishes a gross counter party credit limit for each possible pair of counterparties. The gross counter party credit limit is the minimum amount of remaining credit between two counterparties.

A trader's terminal will display a subset of the trading book, typically the best few bids and offers. These will be updated periodically to ensure that the trader sees the true state of the market.

A problem with the system outlined above is that the trader sees the bids and offers irrespective of whether he has sufficient credit with the counter party submitting that bid or offer to trade. As a result, a trader can attempt to trade when there is no available credit. As the system is anonymous the trader has no knowledge of the counterparty until a trade as been completed and so, when he hits a bid or offer, has no idea as to whether it is likely to be accepted or rejected for lack of credit. This is extremely frustrating for a trader, particularly in a fast moving market in which trading opportunities can easily be lost. The problem arises as the host computer only checks available credit after a deal has been proposed and a potential match identified.

This problem was solved in WO93/15467 now assigned to EBS Dealing. Resources inc. Instead of displaying the actual trading book, or a part of it, to each trader, a different market view is shown to each trader in which bids and offers from counterparties which whom they have insufficient or no credit are screened out. Thus, the trader only sees prices with which he knows he can deal.

The architecture of the system of WO93/15467 is very different from the of the Reuters system and is based on a distributed network with a number of arbitrators which perform matching. Actual credit limits are stored at local bank nodes to which each of a bank's trading terminals are connected ensuring that sensitive credit data does not leave the bank's physical site. The actual trading book is sent by the arbitrators to the market distributor. The market distributor forms a market view specific to a given trading floor and sends it to the relevant bank node. A different market view may be formed for each trading floor depending on credit criteria. Thus, the market view which is distributed to each of the bank nodes is the complete market view with credit screening taking place, the market distributor to filter out any prices with which the bank, or a given trading floor within the bank, has insufficient credit.

In addition, the market distributers also have limited credit information, maintaining a credit matrix which may store a simple "yes-no" credit indicator for given counterparties. When a match is made, the prices having already been screened for credit, the bank node will make a second credit check using the credit matrix to see whether any previously extended credit has already been exhausted.

While both the above systems have been used successfully in the financial trading markets for a number of years, they both suffer from the disadvantage that they require banks to tie up large amounts of credit in one area of their trading activities. A typical bank will be trading a number of financial instruments and a number of different markets and will want to trade up to its credit limits in each trading day. If one particular market is quiet it will want to be able to divert the credit assigned to that market to a different field. Similarly, if a particular market is very active it will want to be able to take advantage of that activity. It should be remembered that a given bank may be dealing with many of the same counterparties in different markets. It is thus undesirable to tie up credit to trades in one particular instrument with a given counterparty as this may diminish the bank's trading capacity within its own global trading limits.

SUMMARY OF THE INVENTION

The invention aims to overcome this disadvantage and in its broadest form provides for the temporary resetting or resetting of credit limits within an anonymous trading system once two parties have concluded an anonymous deal, their identities have been revealed and they have agreed that they would like to trade further.

In a presently preferred embodiment the credit limits of the counterparties within the anonymous trading system are raised by the amount of the further trade. To avoid the true anonymous trading limits being affected, the system stores assigned credit, utilised credit and available credit. Both the assigned credit and the utilised credit limits are revised by the same amount leaving available credit unchanged.

An advantage of such a system is that further trades may be performed once two parties know each other's identity that are outside the credit limits initially assigned to the anonymous trading system but the further trade is performed by the anonymous trading system. As a result banks do not have to tie up large amounts of credit in the anonymous trading system, which may not be fully utilised, but may move credit from an external source to allow a specific deal to be completed. This allows the bank to maximise the benefits of an anonymous system to locate a potential counterparty for a large deal without having to declare its identity and without preventing the credit required for that deal, which may never happen, from being used or available elsewhere so maximising the trading capacity of the bank.

In accordance with one embodiment of the invention the credit checking procedure within the anonymous trading system is bypassed during a conversational more quantity deal. Credit checking is less important as a trader must have authority, for example, from a trading floor administrator, to propose or accept a more quantity trade and the credit utilised may be drawn down from a credit limit with the counterparty external to the anonymous trading system.

In accordance with the invention trader terminals are connected via a communications network and the anonymous trading system comprises at least one matching engine connected to the network matching bids and offers and for executing deals, and at least one market distributer connected to the network for distributing price messages to the trade terminals and responsive to the price quotation messages and the matching engine. In a preferred embodiment of the invention the matching engine and the market distributer are amalgamated into a broking node. The network has a plurality of broking nodes each of which has equal status within the system.

In a preferred embodiment the identity of the counterparty to a deal is displayed at the trader's terminal together with an identification of the actual counterparty trader, a further trade is initiated by selecting a completed deal and sending a 'further trade' request message across the network. This message is treated as a private targeted message and is sent via the quickest route through the network and not distributed to any other broking nodes. Other traders are not aware of the further deal but may be made aware once it has been completed.

In one embodiment of the invention the further deal is initiated through a soft key on the traders terminal. In another embodiment it is initiated through a hard key on the traders keypad.

BRIEF DESCRIPTION OF THE DRAWINGS

An embodiment of the invention will now be described, by way of example only, and with reference to the accompanying drawings, in which:

FIG. 10 shows a More quantity screen;

FIG. 11 is a table showing credit limits of one party with another after three trades;

FIG. 12 shows how the table of FIG. 11 may be adjusted to allow a More quantity trade; and FIG. 13 shows the counterparty's display when a More request is received.

DESCRIPTION OF PREFERRED EMBODIMENT

The present invention will be described with reference to the dealing architecture illustrated in FIGS. 1 to 7 and which will be hereinafter described. However, it should be understood that the invention is not limited to that architecture but could be implemented in any anonymous trading system. For example, it could be implemented on either of the Reuters and EBS Dealing Resources prior art systems known in the art and referred to earlier.

The electronic brokerage system to be described provides a platform for trading at least the following instruments: FX (Foreign Exchange) Spot, FRA's, and Forwards and also FX Forwards, CFDs, short-dated government and/or central bank paper, commercial bills, CDs, inter-bank deposits, commercial paper, repos, interest-rate futures, swaps, options and a miscellany of tailor-made variants on these basic products. These are all referred to as financial instruments. It may also be used for trading non-financial products such as commodities.

Traders at trader terminals are connected to a communications network which allows electronic messages to be passed between terminals, submit quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell order submitted by a trader wishing to create a deal on the basis of a price displayed on his market view derived from one or more quotes. Hits are orders which are invisible to other traders.

Figure 1:
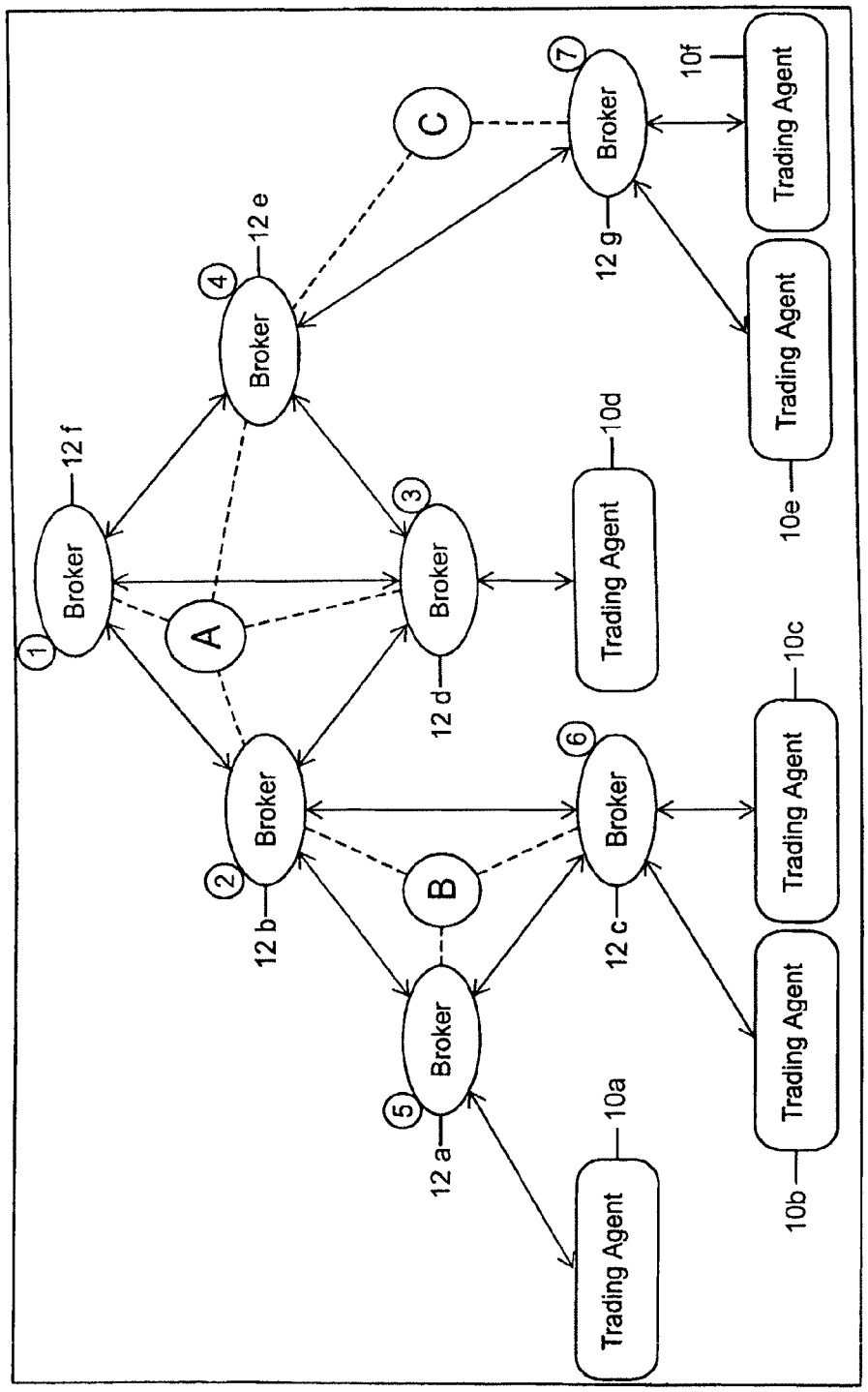
FIG. 1 is an overview of a trading system embodying the invention.

The computer trading system of FIG. 1 comprises a plurality of trading agents 10 each connected to at least one of a plurality of broker nodes 12. Each trading agent is the means by which the trader terminals access the trading system with a given trader terminal being attached to one or more trading agents.

Trader terminals (not shown) may be workstations or other computer terminals configured to generate and submit electronic price quotation messages including bid and/or offer prices, quotes and orders (usually through use of a specialised key pad) and to communicate market view data, including price and amount available, for financial instruments to be traded. The communication is usually by display but could also be by printing the information, voice synthesis or otherwise.

Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) that the traders can see that reflect the market. The market views are preferably pre-screened for credit compatibility, as described in WO93/15467. Thus, traders only see displayed quotes with which they can trade. As well as extending credit to a trading floor, credit may be extended to a bank as a whole (many banks have several trading floors in different locations), or to an individual trader or group of traders. Credit may be extended from the bank as a whole, from a trading floor or from an individual trader.

The system is an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 (shown individually in FIG. 1 as trading agents 10a through 10f) to access the system.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbour Brokers. Communication between Brokers, is on an equal level, with no "up" or "down" direction in the network.

In the embodiment of FIG. 1, there are three Cliques: that formed by brokers 12a, 12b and 12c, that formed by brokers 12b, 12d, 12e and 12f and that formed by brokers 12e and 12f. It will be seen that brokers 12b and 12e are both in two Cliques.

While Trading Agents must be connected to at least one Broker node, they are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term. Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

Thus, the broker nodes each provide a matching engine which is connected to the network for matching submitted bids and offers and, when a match is made, for executing deals. They also perform the function of market distributors distributing prices messages to the trader terminals in response to the price quotation messages and the matching engine. Within the context of the present embodiment it is preferred that the matching and market distribution functions are amalgamated in the broking node but the invention is equally applicable to systems in which the functions are separate and performed at geographically and/or logically separate locations. An example of such a system is disclosed in WO93/15467 referred to earlier.

The Broker nodes are equal to each other, and perform the same functions. The arrangement of the network or their position in it is transparent to the broker nodes. They only need to know about their neighbours. Each Broker node has knowledge of all orders in the market, and is able to match orders as soon as they are submitted. As each Broker node maintains a full list of orders in the market, it is therefore able to customize market views as needed by the Trading Agents and is able to react faster to market information as soon as it is received.

Figure 2:
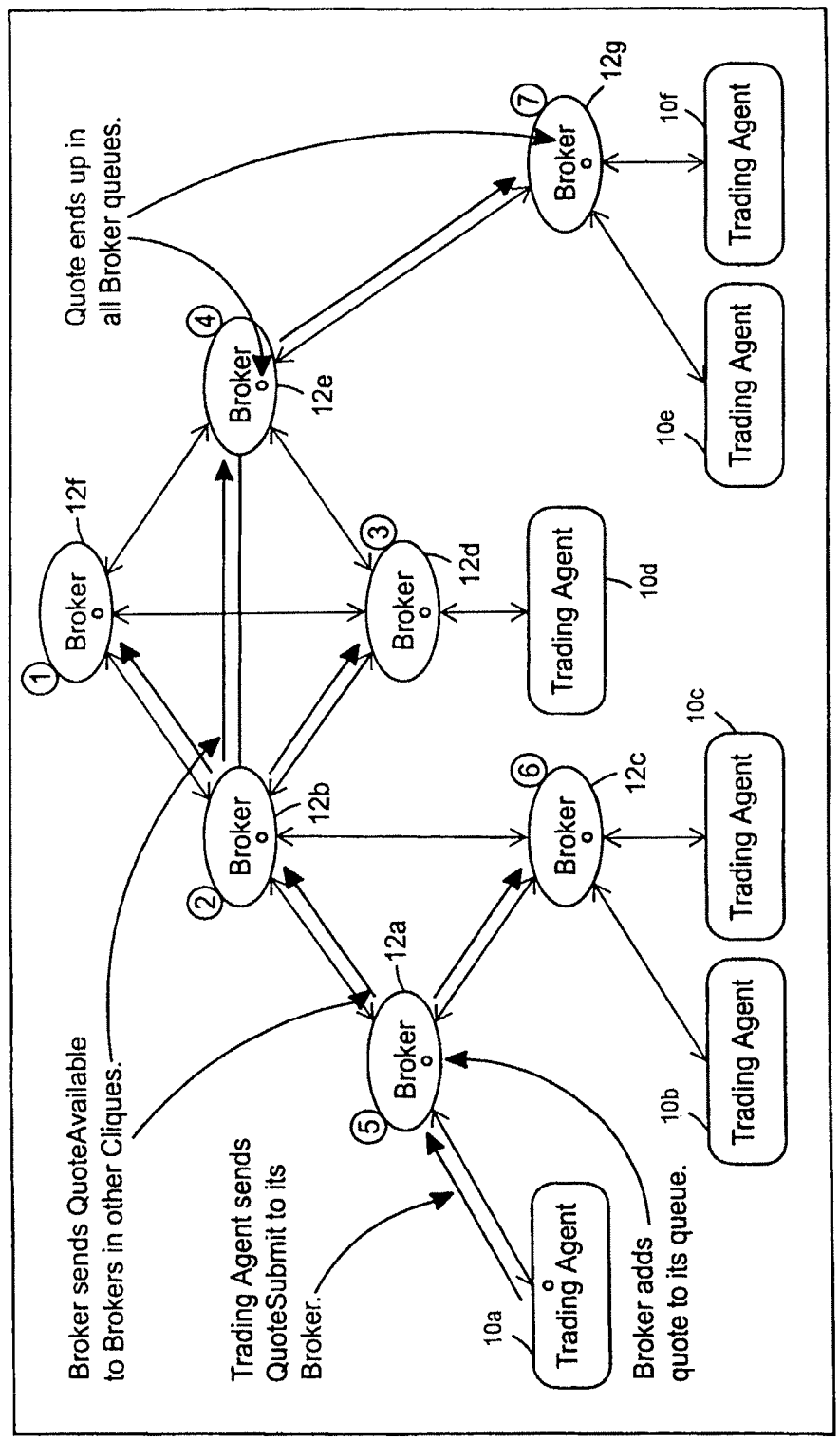
FIG. 2 shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has "invisible" and "fill or kill" properties ("invisible"). Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes. In a system such as foreign exchange there will, effectively, be two books, one showing orders to buy and the other showing orders to sell.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In the example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbours except those in the same clique as the broker who sent the message. Therefore, Broker node 2 sends it to 1, 3 and 4. Broker node 4 then sends it to Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
1. The Broker node originating information will send it to all of its neighbour Broker nodes.
2. A Broker node receiving the information will send it to all of its neighbours Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so the above rules apply.

Figure 3:
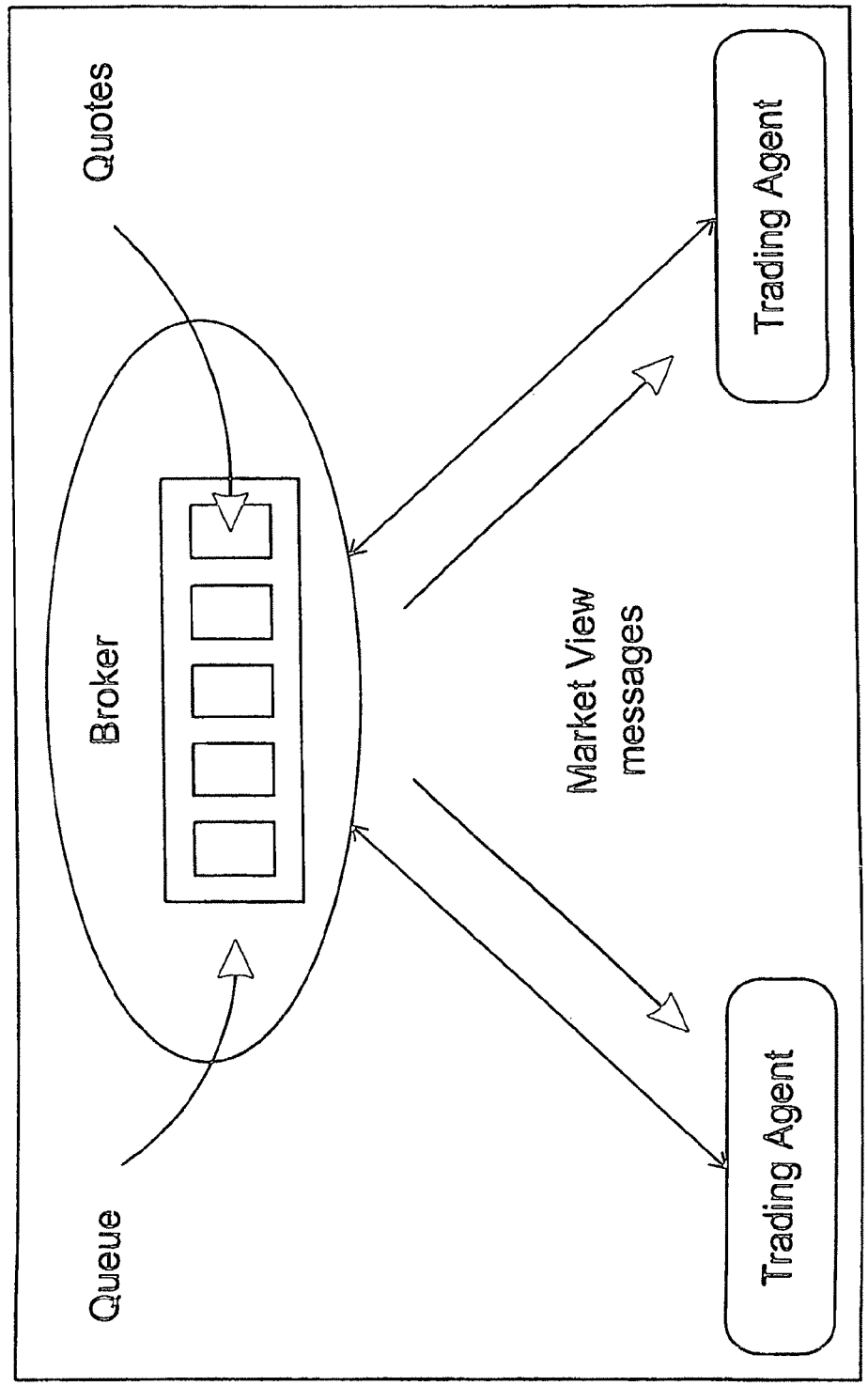
FIG. 3 depicts the production of a market view to traders.
Figure 4:
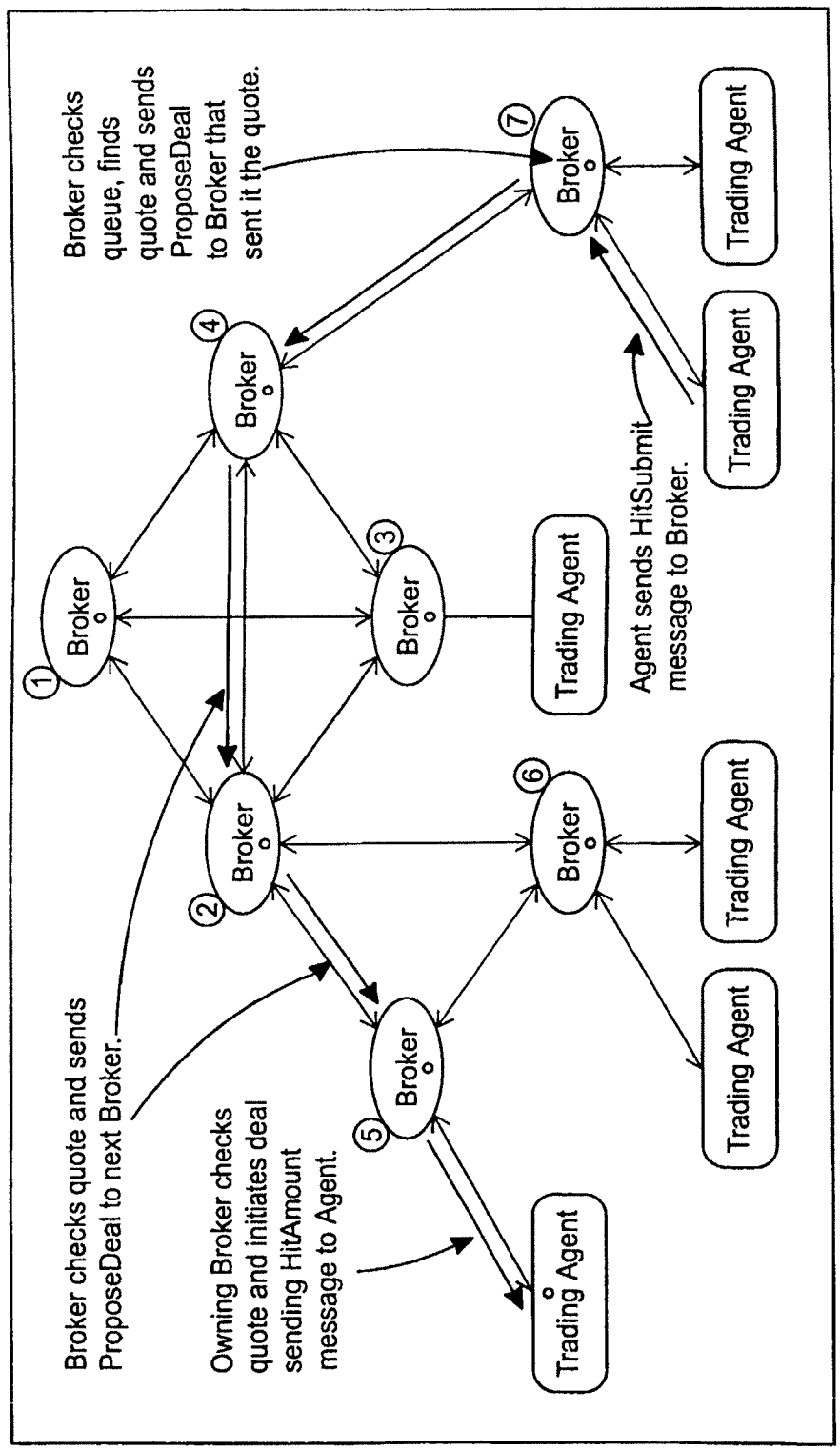
FIG. 4 shows the flow of messages when a trader submits a buy or sell order.

Price distribution is the process of providing market information to the traders at the trader terminals. This information is created by the Broker nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message. It follows, therefore, that each of the brokers hold credit information for each trader and the possible counterparties.

Hitting a quote is the basic process of creating a deal between two traders. A hit from one trader is matched to a quote from another trader. This process is shown in the FIG. 4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, the hit comes from a trader connected to a trading agent connected to broker 7. Broker 7 will send the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:
1. A Broker node originating a message about a specific piece of information will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 4 and 2.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
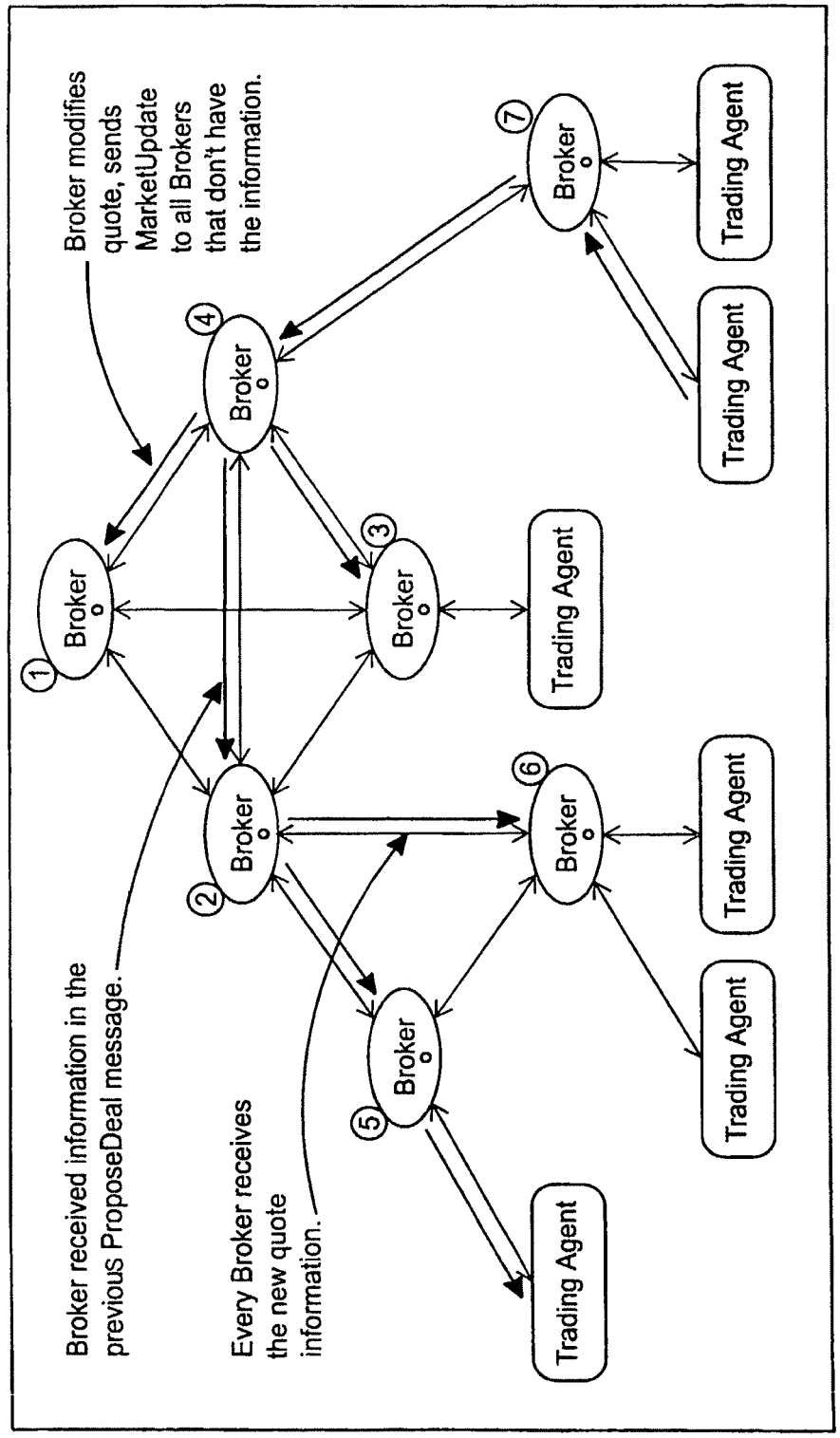
FIG. 5 shows the flow of messages to update broker nodes following a buy or sell order.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbour Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbours not in the clique from which it is received. Note that a Broker node sending a ProposeDeal message should not also send a MarketUpdate message to the same Broker node. This would result in duplicate information being received and the deal amount being reserved twice.

Figure 6:
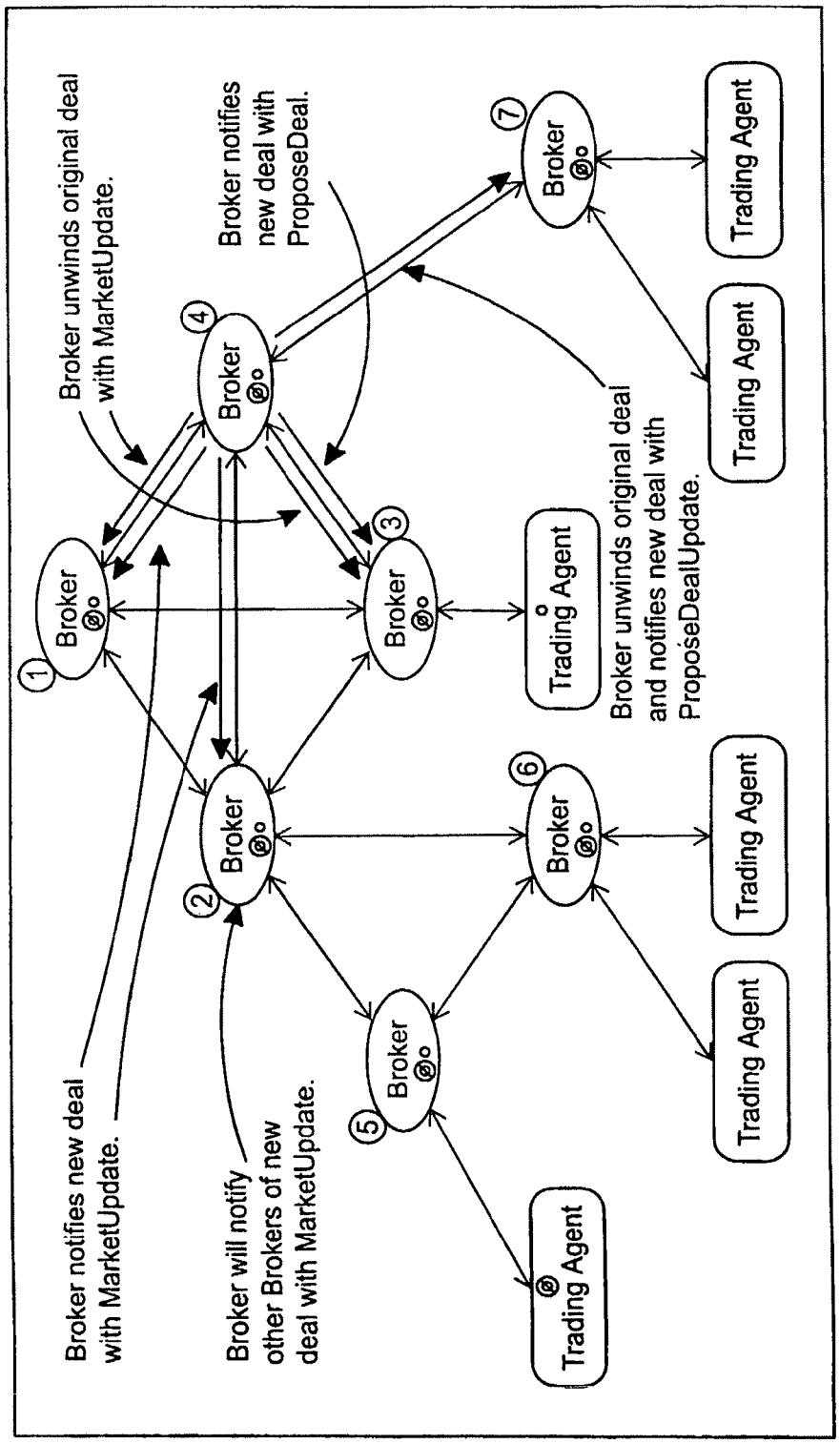
FIG. 6 shows the message flow when a broker updates a quote.
Figure 7:
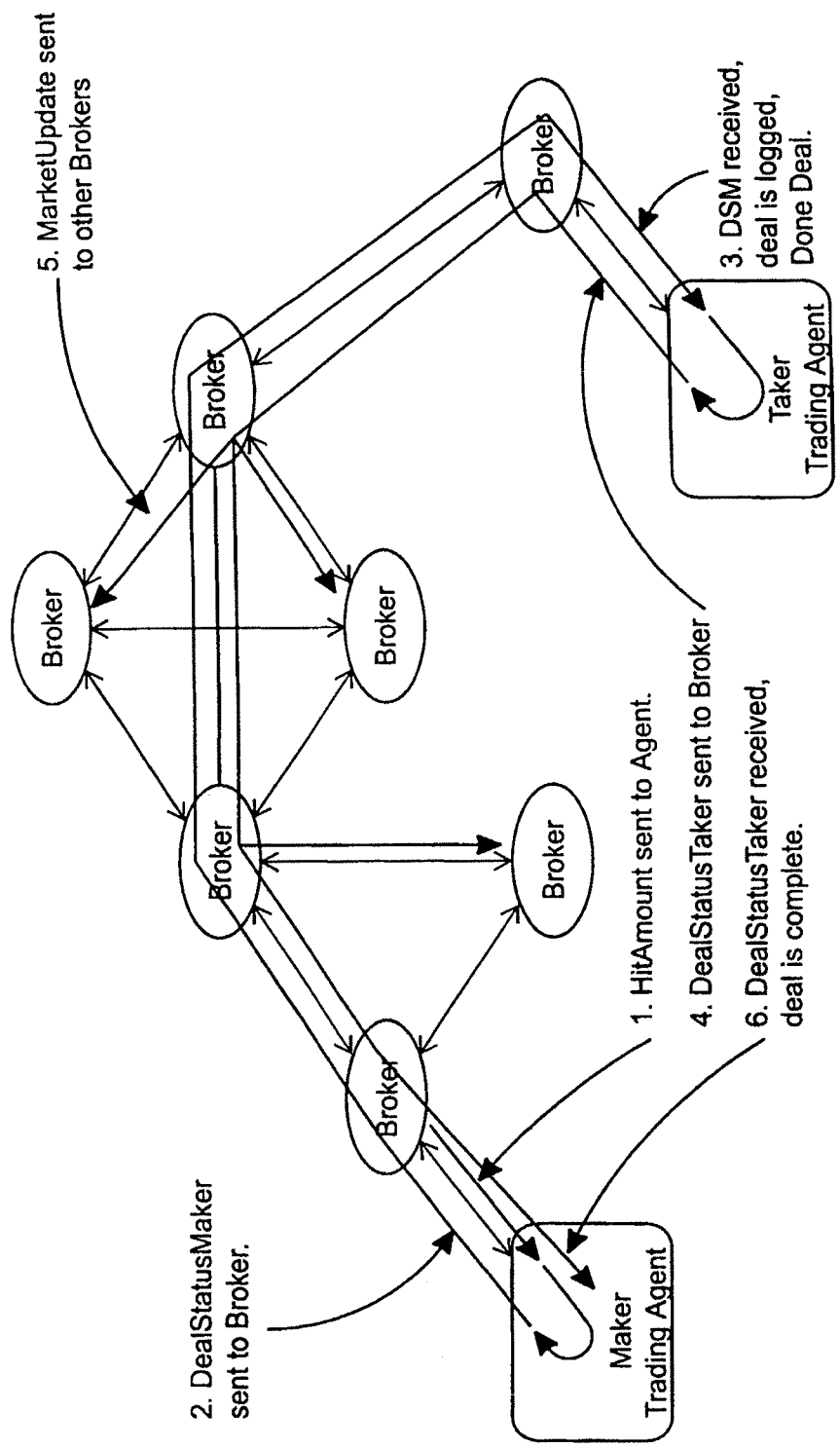
FIG. 7 shows the deal execution process.

When the deal matching process is completed, as described above, the deal execution process begins. This process completes the deal and commits the traders to a deal. The process is shown in FIG. 6. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't yet know. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The DealInformation message is sent to the Broker node. The network Broker nodes will then route the message to the other Agent where the information is processed as required by the instrument. A deal is thus completed.

Once the deal is complete, the two parties will know the identity of their respective counterparty for the first time. The identity will be displayed on their terminal screen and shown, for example, in a listing of deals performed in that trading session as well as printed on the deal ticket and logged to disk. Each of these comprises a means for identifying to each of the parties to an executed deal the counterparty to the deal.

If one of the counterparties would like to deal further with that particular trader, at the same price, they would not normally deal though an anonymous trading system as, by definition, that system does not permit the identity of the counterparty to be known. Also, the available credit assigned to that anonymous system may not allow large deals to be performed. Traditionally further dealing would have to be performed by external means such as a voice broker.

When a bank or a trader wants to trade a very large amount they are often reluctant to offer the whole quantity to the market until the identity of possible counterparties is known. Thus, the trader will first identify possible counterparties by offering a small amount of the potential trade to try and identify a suitable counterparty for a larger trade. Once a suitable counterparty has been identified, the trader offers that counterparty the possibility of a further trade at the same price as the first trade. This is conducted over the broking system described but is a private trade between the parties.

Figure 8:
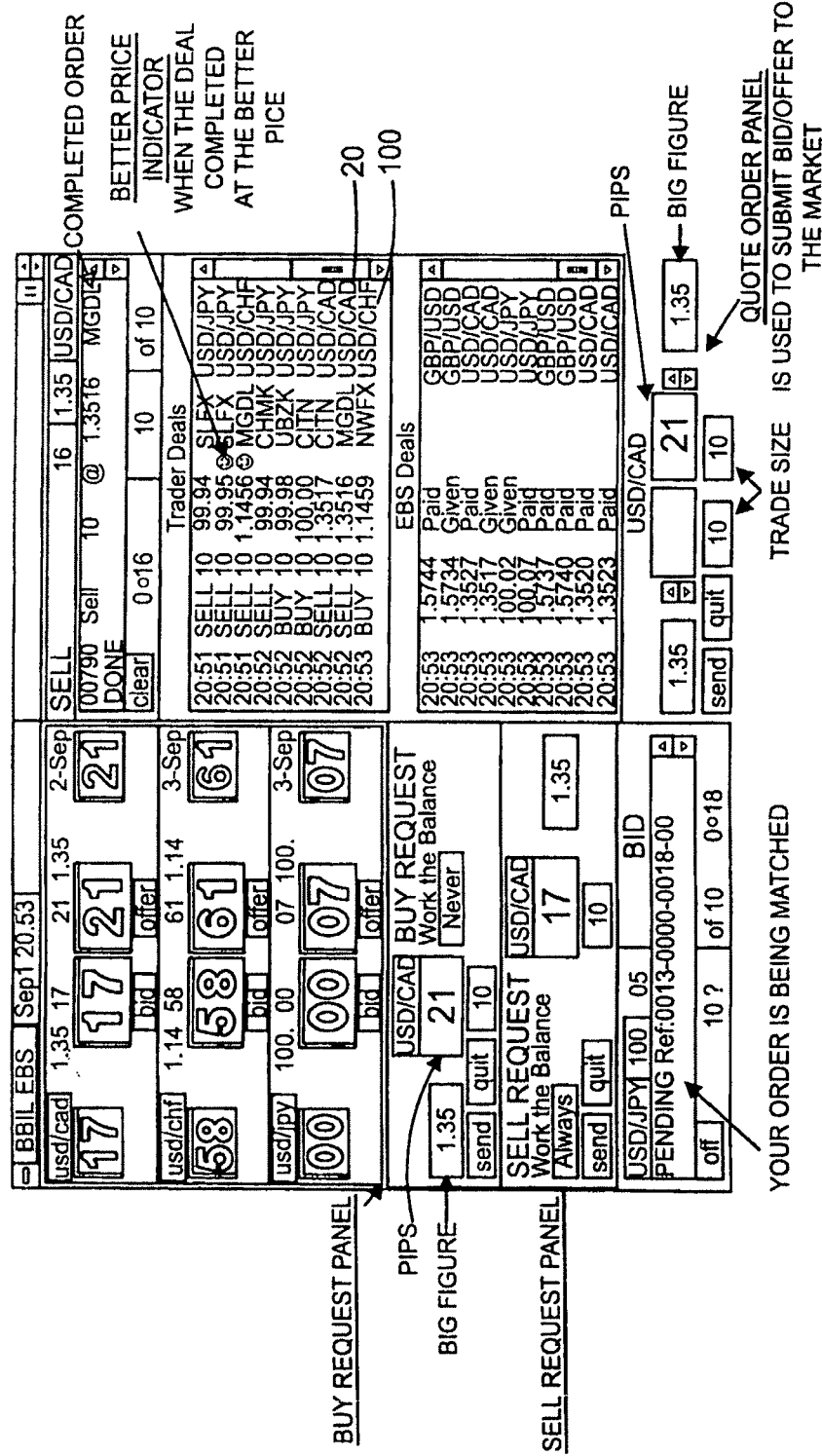
FIG. 8 shows a typical trader display.
Figure 9:
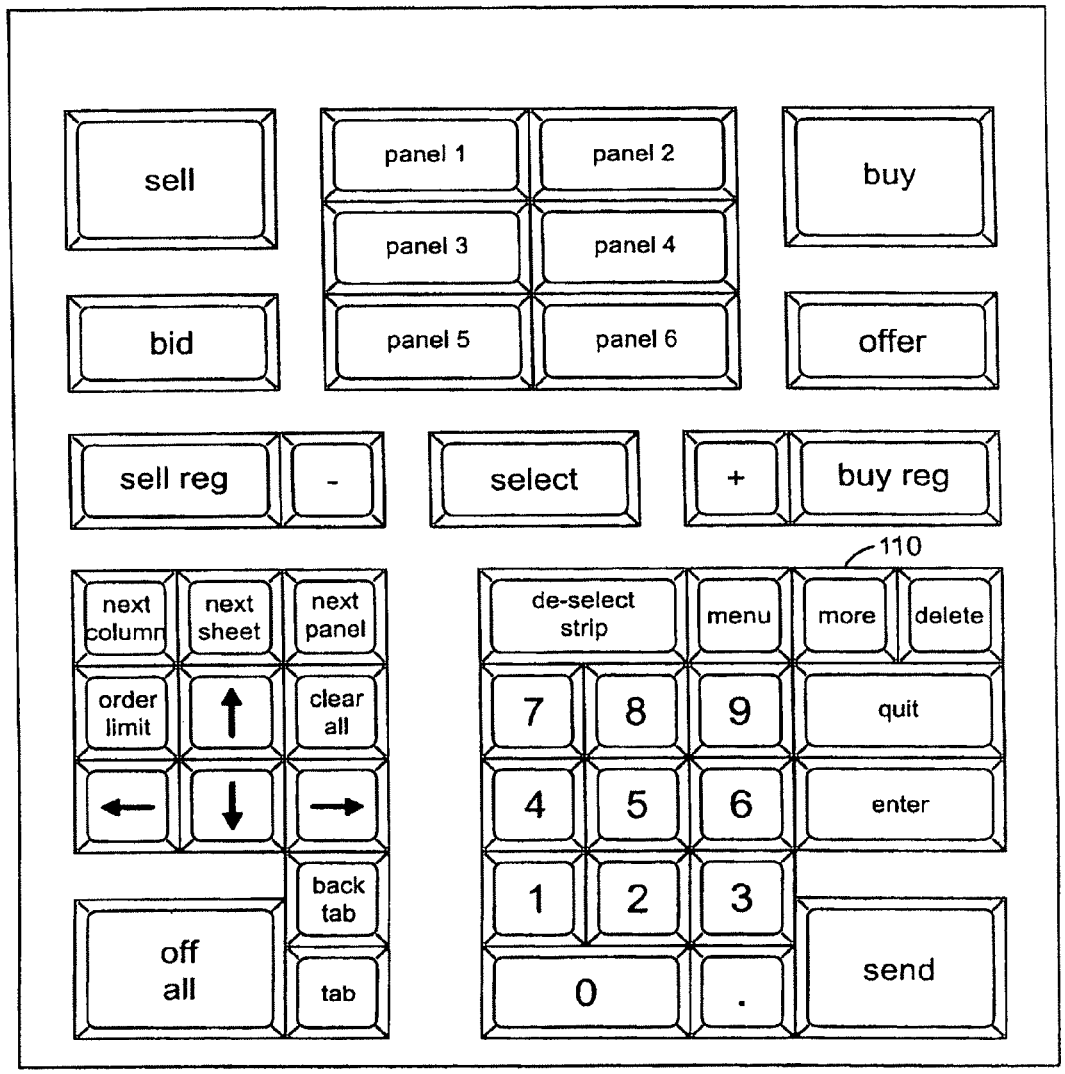
FIG. 9 shows a trader keypad with a hard More key.

The trader may identify the counterparty with whom he wants to investigate a further trade. This may be done by scrolling through the lists of trades which have been completed and double clicking on a trade with the selected counterparty using a mouse or a similar pointer device. FIG. 8 illustrates a typical trader display with a window showing completed deals and a particular deal, identified by the reference numeral 20, highlighted. The display tells the trader that at 20:53 $10 million was sold on the US Dollar/Canadian Dollar market at a rate of 1.3516 to a counter party identified as MGDL. As an alternative to double clicking, the trader could highlight or select a deal and hit a further deal or "More" key. This may be a soft key on the display or a hard key on the traders key pad or keyboard. FIG. 9 shows a keypad with a hard More key 110. The keypad shown in FIG. 9 is intended for a FRA dealing system and is shown only to illustrate the hard more key.

Once a trader double clicks a deal or hits a More key, a More screen is displayed at his terminal. This screen will ask the trader for the identity of the bank with which he wants to deal further, the actual trader within the bank with whom he wants to deal, and the amount of the further deal. An example of a More screen is shown in FIG. 10. As the trader's terminal already has the bank and trader details these can be entered into the screen automatically from the selected deal once the More key is hit or the deal double clicked. The trader then sends the More request by, for example, hitting a submit key on the keypad. This may be the quote submit key used for submitting conventional quotes to the system. It will be appreciated that the More display screen is one example of a means for offering to the counterparty trade at the same price as the executed deal.

The proposed further trade is a private conversational deal; that is it is a deal between two known parties outside the usual parameters of the anonymous trading system. The system handles the More request as a targeted message which obeys the targeted messaging rules described above. Thus, using the example of FIG. 4 above, a deal was concluded between a trader coupled through its trading agent to broker 5 and a trader coupled through its trading agent to broker 7. The More request would be sent from broker 5 to broker 7 via broker 2 and 4. The intermediate brokers 2 and 4 are transparent to the message and do not send update messages on receipt of a More trade request. Thus, the market does not show the More trade request and it will not appear in other trade market views. However, once a deal has been concluded privately, details of the deal may be passed to the market to ensure that traders have as much information about the market as possible.

Credit for the More deal is dealt with outside the 5 conventional credit limits of the system. If a trader were to try and trade an amount over his normal credit limit with the counterparty, the deal would be rejected under the credit checking procedures. In conventional systems, the counterparty credit limits can be varied during the day but usually only by a trading floor administrator (TFA). In the More routine the individual trader assumes the functionality of the TFA for the purposes of the proposed More deal only. It is left to the trader's bank to authorise the trader to conduct More quantity trades and accessibility to the More screen may be controlled, for example by the TFA.

The trader will increase the trading limits with the counterparty with whom he wants to trade by the amount of the proposed More trade. However, the amount of credit utilised is also increased by the same amount so that the net available balance after the trade is the same. Thus the credit limit increases is specific to the More trade only and is transparent to further dealings between the parties. This principle is shown in FIGS. 11 and 12. FIG. 11 shows a credit limit between a party A and a counterparty B. At the beginning of the trading day a credit limit of $20 m is assigned. Before trading commences none of that credit has been utilised and the amount of available credit is $20 m. Several deals are then made and the amount of credit utilised and available are increased/drawn down respectively by the amount of the deals. Thus after three deals $16 m of credit has been utilised and $4 m remains.

In FIG. 12, the dealer concludes a More quantity deal for a further $50M. Acting as TFA for that deal he increases the credit limit by $50 to $70 but as it is a More quantity deal the system automatically increases the credit utilised by the same amount, the this case from $16 m to $66 m. As a result, the credit available is unchanged at $4 m.

As an alternative to the procedure set out above, the system can be set up such that a More trade bypasses the conventional credit checking procedures implemented when a deal is proposed on the system. This can be justified on to the basis that the identity of the two parties is known and the credit for the deal is drawn from outside the anonymous trading system. Whether credit checking is suppressed for the More quantity trade or whether credit limits are temporarily adjusted for the More quantity trade it will be seen that the system provides a means of executing the further trade irrespective of whether the further trade exceeds the initially stored credit limits assigned by each of the parties to the trade to the other. The More trade is conducted irrespective of whether or not it exceeds the credit limit of one or both of the counterparties when the original deal was made.

When a counterparty receives a More quantity request he can deny the amount, approve less than the amount, approve the amount, or approve the amount and request that even more be done at the same rate. Whichever of the two credit options described above is adopted, showing an amount to a counterparty at this or any stage of the More trade is tantamount to credit approval. If the counterparty denies the More request then the deal is unchanged from its initial amount. If the More amount requested is reduced then the amount done is the original amount plus the reduced amount and if the whole of the amount of the More request is done then the total amount is the basic deal plus the More amount. Where the counterparty suggests an amount greater that the More request then the More request is done and the originator of the More request must approve, approve less or deny the request increase. The originator could seek to increase it still further in which case the process s repeated again. FIG. 13 shows the counterparty's display when a More request is received identifying the deal number to which the request relates, the price, the originating bank and trader and the amount of the More request. The counterparty also enters the amount of the request he wishes to approve together with any further amount. In the example shown in FIG. 13 the screen also has a soft submit key to transmit the response back to the originating trader but this may also be a hard key, for example on the key pad.

The More quantity process enables banks to pre-allocate credit only on a limited basis. Credit which is available is only partially allocated to the bank's other trading activities. If it is required for a trade using the anonymous trading system it may be reallocated to that system and used up. However, the bank is not required to tie up large amounts of credit in one system which cannot be used in other trading activities. This avoids the possibility of the bank reaching its credit limits in some trading areas but still having unutilized credit in the anonymous system. While that is still possible in the system as described, the amount of credit which needs to be allocated to the anonymous system is relatively small. Thus, the system described enables the user banks to maximise their trading capacity over all the available trading mechanisms.

What is claimed is:

1. A method for trading in an anonymous trading network, the method comprising:
    executing an anonymous trade over the anonymous trading network between a first and second party;
    identifying the first and second party to each other after the anonymous trade has been executed; and thereafter
    permitting the first and second party to execute a conversational trade using the anonymous trading network.

2. A method of trading using an electronic anonymous trading system, the method comprising the anonymous trading system:
    executing a first trade between a first and a second trader party based on bilateral credit limits related to the respective parties; and thereafter
    permitting the first and second parties to execute a second trade, without regard to credit limits, based upon the fact that the first trade has been executed.

3. The method of claim 1, wherein the anonymous trade is made as a function if stored credit limits and the conversational trade is not.

4. The method of claim 3, wherein the stored credit limits are stored within the anonymous trading system and indicate how much credit the first party extends to the second party and how much credit the second party extends to the first party.

* * * * *